United States Patent

Timmons et al.

[15] 3,656,800

[45] Apr. 18, 1972

[54] DUMP BODY TAILGATE WITH DOUBLE ACTION PIVOT AND LOCK MECHANISM

[72] Inventors: Frank C. Timmons; Carl Smith, both of Columbus, Ohio

[73] Assignee: Timmons Metal Products Company, Columbus, Ohio

[22] Filed: Mar. 27, 1970

[21] Appl. No.: 23,353

[52] U.S. Cl. .................................296/50, 16/147, 49/193, 298/23 R, 298/38
[51] Int. Cl. .................................................B62d 25/00
[58] Field of Search.....................296/50, 51, 28 D; 280/163; 49/193; 16/147; 105/281; 298/23 R, 38

[56] References Cited

UNITED STATES PATENTS

| | | | |
|---|---|---|---|
| 1,538,756 | 5/1925 | Stifter | 296/51 |
| 3,403,473 | 10/1968 | Navarro | 49/193 |
| 2,660,454 | 11/1953 | Coumerilh | 280/163 |
| 1,735,408 | 11/1929 | Nein | 296/51 |
| 2,195,991 | 4/1940 | Lovett | 49/193 X |

*Primary Examiner*—Leo Friaglia
*Assistant Examiner*—John H. Pekar
*Attorney*—Mahoney, Miller and Stebens

[57] ABSTRACT

A tailgate for a dump body provided with upper and lower hinge pivots and locking arrangements which are normally in locked condition but can be selectively actuated to hinge either the upper edge or the lower edge for swinging respectively up or down relative to the body during dumping. The selection is made by means of a single control lever connected to the pivot and locking arrangements by linkage which permits movement of the single lever from a central locking position in either of opposite directions to make the selection. The dump body is further provided with a combination bumper and step arrangement which not only protects the body but provides a step upon which a person can stand to be in a position to readily operate the selection lever.

3 Claims, 6 Drawing Figures

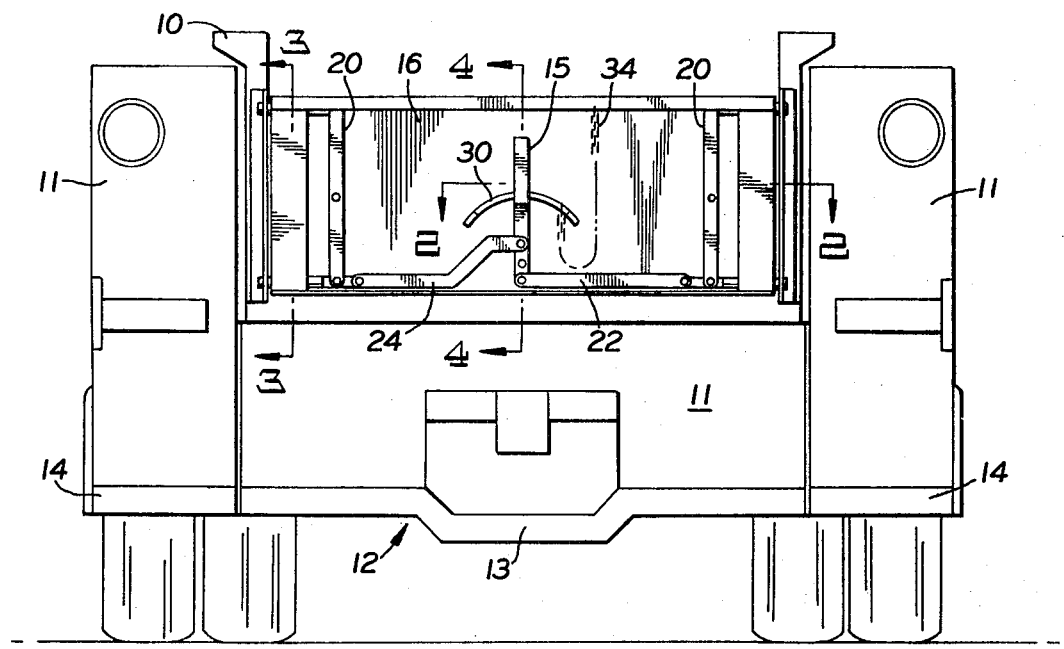
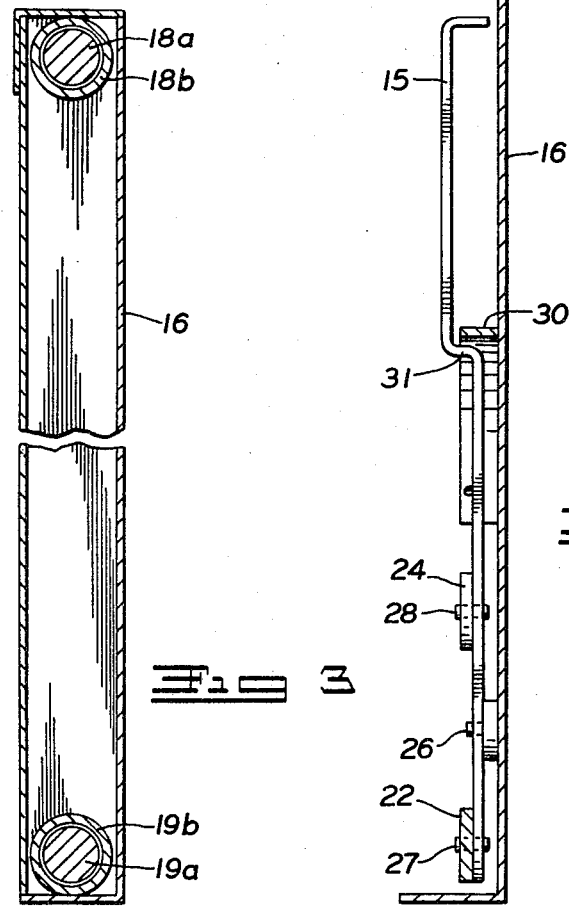
Fig. 1
Fig. 3
Fig. 4
INVENTORS
FRANK C. TIMMONS
CARL SMITH
BY MAHONEY & MILLER
BY- *Wm. V. Miller*
ATTORNEYS

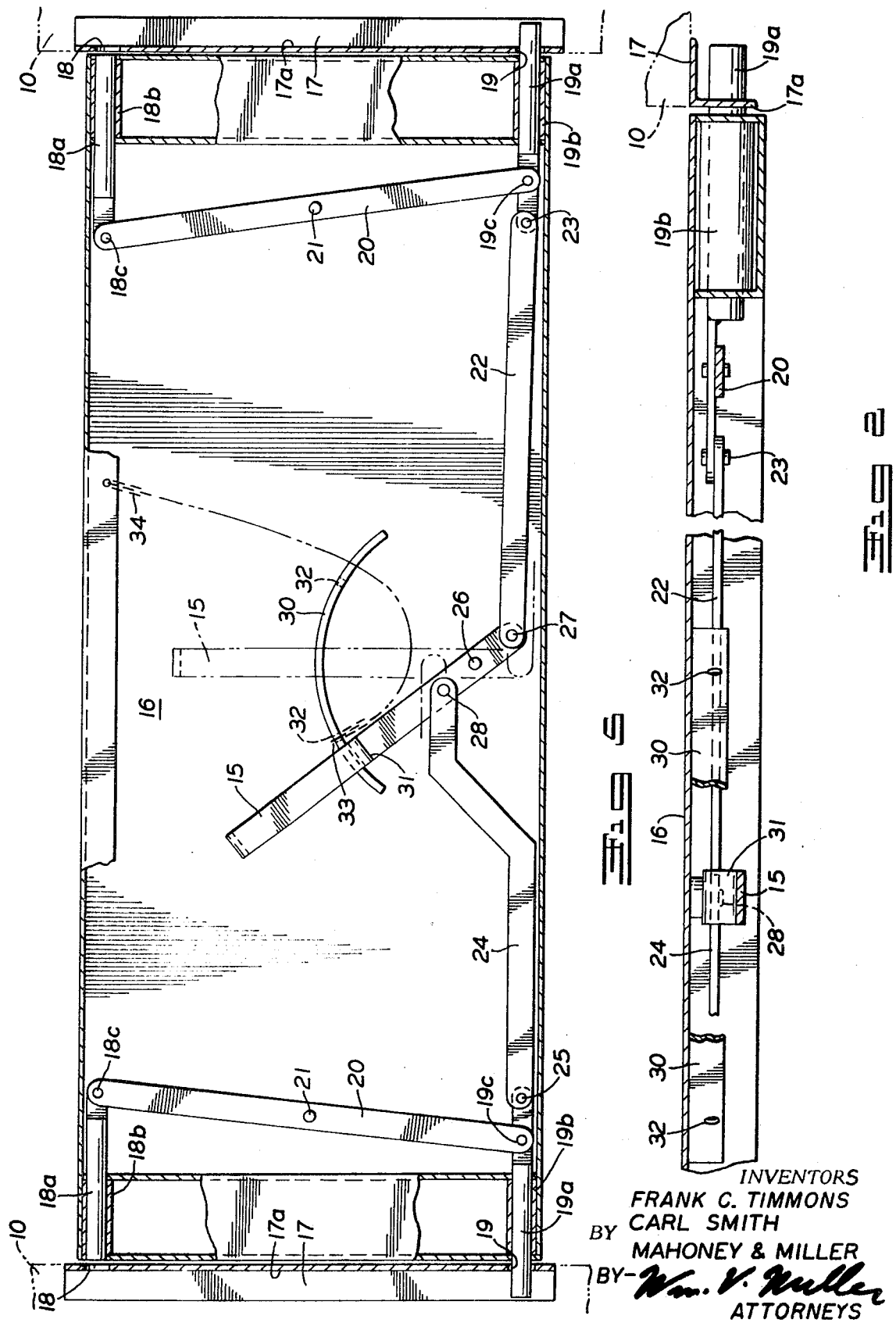

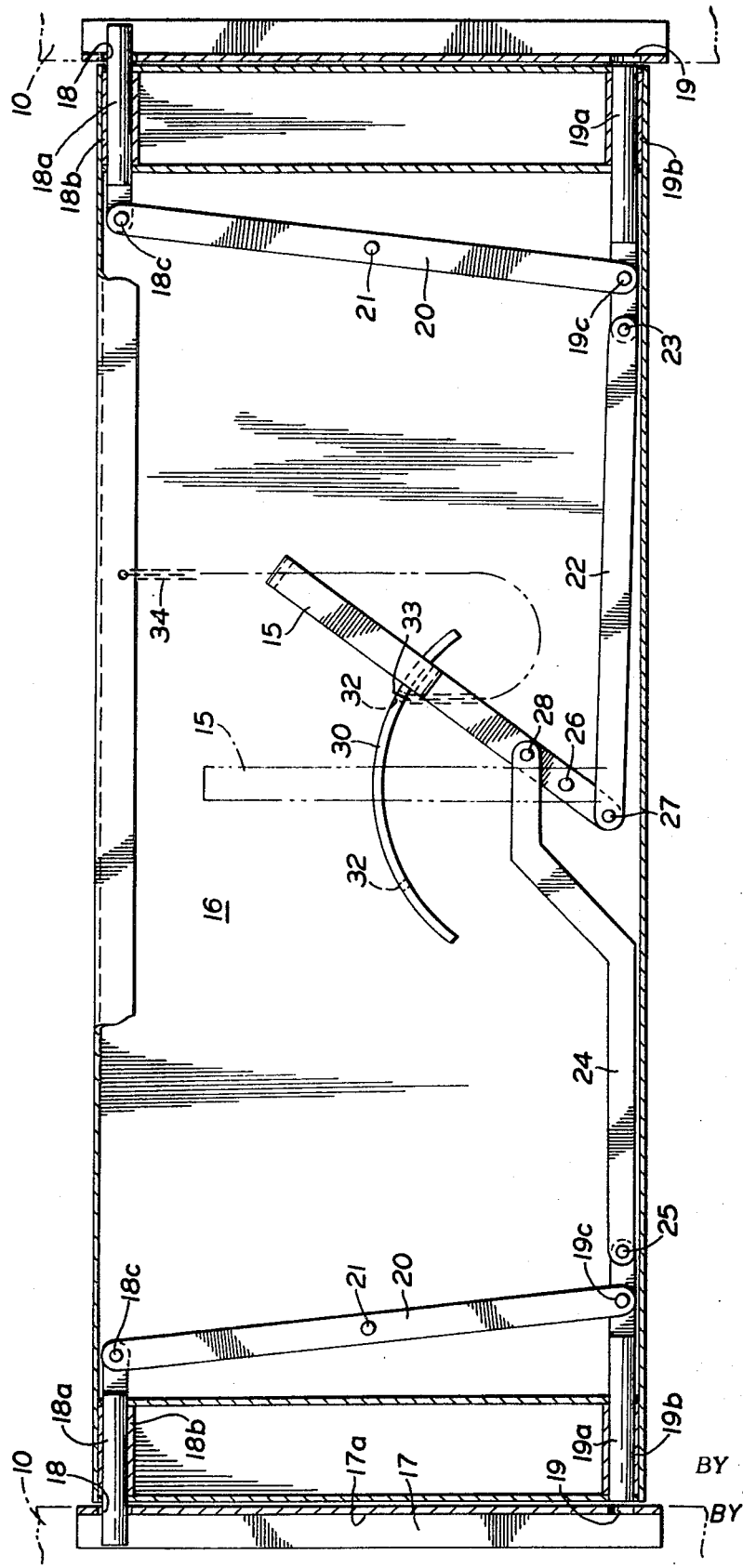

DUMP BODY TAILGATE WITH DOUBLE ACTION PIVOT AND LOCK MECHANISM

Various arrangements have been provided in connection with tailgates for dump bodies whereby either the upper edge of the tailgate or the lower edge thereof may be selectively hinged for dumping. However, with these prior art arrangements, it is either necessary to remove and replace pins to made the selection or to operate separate levers to make the selection whereby the gate can swing down or up. The present invention provides a simple arrangement whereby a single lever only is moved in opposite directions to make the selection. Also disposed in association with the rear end of the tailgate is a bumper and step arrangement whereby the operator can stand on the step and is thereby in a convenient position relative to the lever to operate it with ease.

In the accompanying drawings, a preferred embodiment of our invention is illustrated and in these drawings:

FIG. 1 is a rear elevation of a combination dump and utility body to which our invention has been applied.

FIG. 2 is an enlarged horizontal sectional view taken along line 2—2 of FIG. 1.

FIG. 3 is an enlarged vertical sectional view taken along line 3—3 of FIG. 1.

FIG. 4 is an enlarged vertical sectional view taken along line 4—4 of FIG. 1.

FIG. 5 is an enlarged view partly in vertical section and partly in rear elevation showing the selection lever in position to select the lower hinge pivots and release the upper ones.

FIG. 6 is a similar view, but showing the selection lever in position to select the upper hinge pivots.

With specific reference to the drawings, and particularly to FIG. 1, we have shown our invention applied to a truck body which includes a longitudinally extending dump body 10 that has cabinets 11 disposed on the opposite sides thereof and extending longitudinally thereof so that the body can be used as a utility body, since tools or supplies can be carried in these cabinets. A dump body 10 will move vertically between the cabinets 11 between lowered position and raised dumping position. A combination bumper and step arrangement 12 is provided across the back of the body and includes a central section 13 which is connected to the dump body 10 at the rear end thereof by a depending rigid apron 11. At each side of the central section 13 are the fixed step sections 14 which are in alignment with the ends of the central section when the dump body 10 is in lowered position. Thus, the combination step and bumper arrangement protects the rear end of the body and provides a step or support on which the operator may stand to be conveniently located in making the selection of the tailgate hinge pivots by means of the lever 15. This lever is disposed centrally of the tailgate that is provided at the rear end of the dump body 10.

The tailgate may consist of a tailgate panel 16 formed of suitable sheet steel or other metal. It is disposed between the side walls 17 of the dump body 10 at the rear end thereof and it will be noted that each of these walls has a pin-receiving socket 18 adjacent the upper edge thereof and a similar socket 19 adjacent the lower edge thereof. The sockets of each pair 18 and 19 are opposed and in axial alignment. The sockets 18 are adapted to receive the upper pivot and locking pins 18a and the sockets 19 are adapted to receive the lower pivot and locking pins 19a. The pins 18a are slideably mounted for axial movement in the upper guide sleeves 18b whereas the pins 19a are slideably mounted for axial movement in the lower guide sleeves 19b. It will be apparent that the guide sleeves 18b are rigidly fixed at the upper corners of the panel 16 and the guide sleeves 19b are rigidly fixed at the lower corners of the panel 16. It will be noted that the sockets 18 and 19 are formed in vertical flanges 17a so that the pins can be projected therethrough to varying degrees.

Suitable linkage is provided for connecting the selection handle 15 to the four pins 18a and 19a whereby when the handle is swung in one direction from a central locking position, one pair of pins is retracted inwardly out of the cooperating sockets whereas the other set of pins is projected outwardly into the cooperating sockets. The linkage comprises an angularly disposed pin-connecting link 20 which is provided at each end of the tailgate and is connected at the pivot points 18c and 19c to the inner ends of the respective pins 18a and 19a. Each link is pivoted midway of its height to the tailgate panel 16 as at 21.

The linkage further comprises an actuating link 22 which extends substantially horizontally and is pivoted to one of the pins 19a as at 23. Another actuating link 24 extends substantially horizontally and its outer end is pivoted to the other pin 19a as at 25. The handle 15 is pivoted to the tailgate panel 16 at a pivot point 26 which is close to but spaced above the lower end of the handle. The inner end of the link 22 is pivoted as at 27 to the lower end of the handle 15 below the pivot 26. The inner end of the link 24 is pivoted at 28 to the lever 15 above the handle pivot 26, the link being provided with an upwardly offset end 29 to properly locate the pivot 28.

With this linkage arrangement, it will be apparent that when the lever 15 is in a center position, as shown in FIG. 1, all the pins 18a and 19a will be extended into locking position within their respective sockets 18 and 19 and lock the tailgate in fixed position. Throwing the lever 15 to the left, as shown in FIG. 5, will withdraw the pivot and locking pins 18a from the retaining sockets 18 and project the pivot and locking pins 19a farther through the lower sockets 19. This will hinge the tailgate at its lower edge so that it can be swung downwardly. On the other hand, swinging the lever 15 to the right, as shown in FIG. 6, will project the pivot and locking pins 18a farther into the sockets 18 and withdraw the lower pins 19a from the sockets 19. This will hinge the gate at its upper edge.

To prevent accidental movement of the lever, a segmental flange 30 is mounted on the outer surface of the tailgate panel 16 and the lever is provided with an offset 31 that swings beneath the flange in cooperation therewith. The flange will be provided with aperatures 32 which will be located inside each outermost position of the lever. These openings can selectively receive a stop hook 33 carried by a chain 34 attached to the tailgate which will engate the offset 31 and serve as a stop. When the hook is inserted in either opening 32, the lever 15 will be retained in position beyond the hook, as indicated by a comparison of FIGS. 5 and 6.

The operator can stand on the central step section 13 and will be thereby conveniently located to readily swing the lever 15 into either selecting position. The selection can be made by the control of the single lever 15 merely by shifting it in opposite directions from its central locking position. This will make it possible to select the pivot and locking pins at the upper or lower edges of the tailgate for upward or downward swinging of the tailgate.

Having thus described our invention what is claimed

1. A dump body movable vertically between a lower position and an upper dumping position and having a tailgate positioned at the dumping end thereof, a pivot and locking arrangement between the upper edge of the tailgate and the body and a pivot and locking arrangement between the lower edge of the tailgate and the body, both of said locking and pivot arrangements being normally engaged to prevent swinging of the gate, means for selecting either of said arrangements to pivot the gate at its upper or lower edges, said means comprising a single selection lever movable from a central position where both of said arrangements are engaged to a selecting position in either direction where one is engaged and the other is released, the locking and pivot arrangements comprising a pair of opposed pins mounted at the upper edge of the gate and movable outwardly in opposite direction into sockets in the body and a pair of opposed pins mounted at the lower edge of the gate and movable outwardly in opposite directions into sockets in the body, linkage for connecting said pins to the single selection lever whereby when the lever is in a central position all the pins are projected into the respective sockets and when it is moved in either direction away from central position the pins of one pair are withdrawn from their respective sockets and the pins of the other pair are projected further into their respective sockets, said linkage comprising a connecting link at each end of the tailgate pivoted intermediate its height and having its upper end pivoted to the adjacent upper pin and its lower end pivoted to the adjacent lower pin, and an actuating link pivoted at its outer end to the lower end of each of said connecting links, said selection lever being pivoted to the gate intermediate its upper and lower ends, said actuating links being connected at their inner ends to the selection lever by pivots respectively above and below the pivot for said lever.

2. A dump body according to claim 1 in which one of the actuating levers is provided with an offset inner end to offset its pivot connection to the selection lever upwardly relative to the pivot connection of the inner end of the other actuating link to the selection lever.

3. A dump body according to claim 2 including releasable stop means for locking the lever in either selection position.

* * * * *